3,846,097
METHOD FOR PROCESSING GLASS AND
FORMING FIBERS THEREFROM
Robert G. Russell, Granville, Ohio, assignor to Owens-Corning Fiberglas Corporation
Filed July 24, 1972, Ser. No. 274,782
The term of this patent subsequent to July 11, 1989, has been disclaimed
Int. Cl. C03c 25/02
U.S. Cl. 65—2      13 Claims

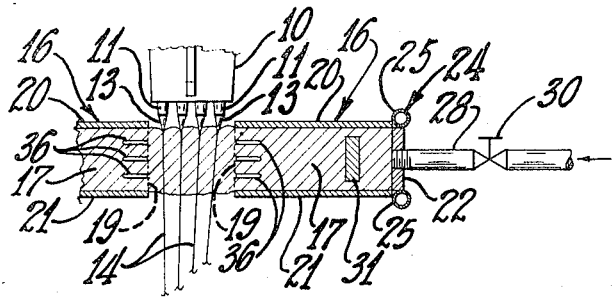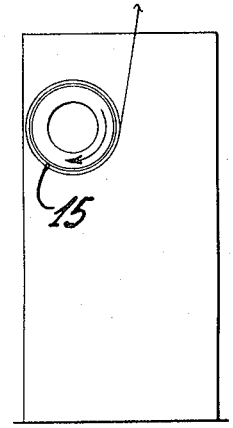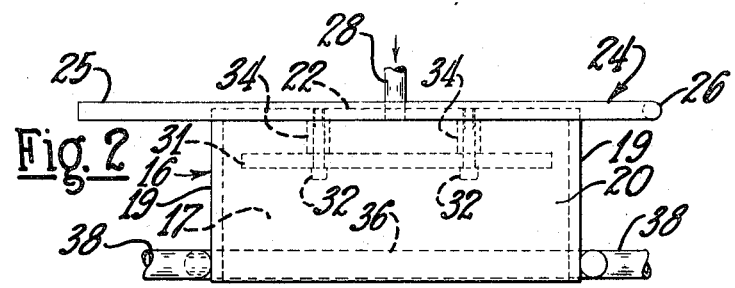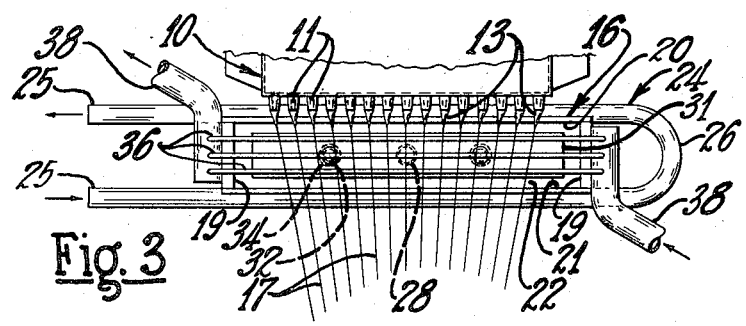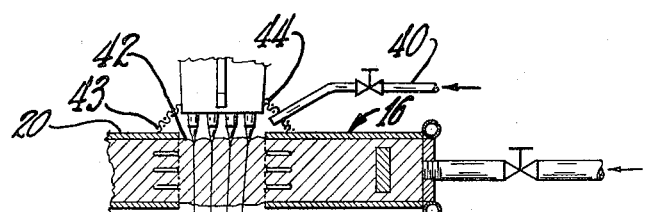

ABSTRACT OF THE DISCLOSURE

A method and apparatus for processing heat softenable, fiber-forming material to form fibers such as glass. A foam is supported adjacent the hot stream feeder from which the molten streams of glass flow and are attenuated into filaments so that the filaments contact and break the bubbles of the foam releasing a gas used for treating the filaments or stream feeder.

BACKGROUND OF THE INVENTION

This invention relates to a method and apparatus for processing fiber-forming heat-softenable materials such as glass and more especially to attenuating or forming heat-softened glass to fibers or filaments.

In forming filaments from heat-softened glass it has been a practice to flow a plurality of streams of glass from a supply contained in a stream feeder or bushing through passages or orifices in spaced projections integral with and depending from the floor of a feeder. In this way individual streams are provided which may be attenuated to continuous filaments by winding the filaments or a strand of the filaments on a rotating collector.

Heretofore it has been found essential in conventional glass filaments forming systems or methods to provide individual or independent projections, each having an orifice through which flows a stream of glass. The metal of the feeder and the projections must be capable of resisting the high temperature of the molten glass, and platinum and platinum alloys have been successfully used. The use of orifice projections depending from a feeder reduces the tendency for the glass to flood over the surface of the feeder. But at times the glass will flood across the face of the feeder resulting in interruption of attenuation.

Flooding is attributed to the tendency of molten glass to wet the platinum alloy surface, the glass readily spreading over the wetted surface. In bushing or stream feeder constructions wherein appreciable space is provided between adjacent projections, the liability for the glass to flood is minimized.

The trend, however, is toward the simultaneous attenuation of a larger number of streams of glass from a single feeder to provide a strand having a large number of filaments. In such arrangements the adjacent projections must be in close relation in order to provide the desired number of streams and a structural arrangement of closely spaced orificed projections of this character presents a greater opportunity for the molten glass to migrate or flood along the adjacent metal surface because of the tendency of the molten glass to wet the metal surface.

My copending application Ser. No. 123,637, filed Mar. 12, 1971 discloses a method of controlling heat-softened material, such as glass, wherein streams of the softened material are flowed from orifices in a surface and wherein the material has a tendency to spread over the surface. The method involves the provision of an environment in the stream delivery region of the surface effective to substantially reduce the size of the beads of glass at the orifices during startup and substantially reduce the tendency for the softened material to spread over the surface. Accordingly, the stream flow orifices may be disposed more closely to obtain an increased number of streams from a given area. Also it is possible to increase the production of filaments attenuated from the streams and reduce the size of the stream feeder of platinum or platinum alloy thereby effecting substanital savings in platinum and a consequent reduction in the cost of producing filaments.

SUMMARY OF THE INVENTION

The present invention embraces a method and apparatus for establishing the environment in the fiber-forming region which is beneficial to the formation of fibers.

An object of the invention the establishment and maintenance of an environment of liquid with gas dispersed therein adjacent a fiber feeder whereby fibers delivered from the feeder move through the environment thereby releasing the gas which is effective to promote improvement in the formation of fibers.

An additional object of the invention is the establishment and maintenance of an environment of liquid with gas dispersed therein adjacent a stream feeder whereby glass streams delivered from the stream feeder move through the environment thereby releasing gas which, at the temperature of the heat-softened glass, is effective in promoting separation of or separating the glass from the feeder.

Another object of the invention is a method of subjecting streams of glass to an aerated or gas containing liquid to condition and control the viscosity of the glass for efficient attenuation and to reduce or substantially eliminate the wetting of the feeder by the heat-softened glass to promote the separation of or actually separating the heat-softened glass from the feeder.

In brief, the invention accomplishes these objectives by establishing and maintaining an environment of foamed liquid adjacent the stream feeder whereby streams of glass from the feeder move through and are engaged by the foam. The foam may contain a gaseous medium comprising either a substantially inert or a non-oxidizing gas and a gas of a character which when subjected to the high temperature at the stream delivery region of the feeder is decomposed. The decomposition products such as carbon render the feeder or bushing surface substantially less wettable by glass thereby preventing flooding and promoting successful attenuation of the streams to filaments.

BRIEF DESCRIPTION OF THE DRAWINGS

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIG. 1 is an elevational view, with portions in section, showing the process and apparatus for supplying a gas containing foam adjacent the fiber-forming feeder.

FIG. 2 is a plan view of the foam supplying apparatus shown in FIG. 1.

FIG. 3 is a side view, with portions in section, of the foam supplying apparatus shown in FIG. 1.

FIG. 4 shows another embodiment of the invention wherein the foam is used as a barrier to help retain the gas supplied by other means.

DESCRIPTION OF THE PREFERRED EMBODIMENTS

According to the invention, it has been found, that a body of foam will be retained by a support surface even though fibers are pulled through the body of foam at great speeds, and that the gas contained within the foam can be used to treat or coat the fibers or feeder. Foams have the advantage of causing a material that is normally a liquid to take on a generally self-supporting structure having but a small amount of liquid. Foams have the further advantage in that they provide a large surface area for the liquid. Foams have the still further advantage in that they can be made from either water systems or from organic systems to provide greatly varying surface condition. And foams can contain any number of different gases within the bubbles.

Foams are generally made by injecting or bubbling a gas through a liquid. Where the liquid has a low surface tension, a foam may be produced without a foaming agent. Where the liquid has a high surface tension, as occurs with water for example, a foaming agent may be necessary. Foaming agents are materials having a polar end and a nonpolar end, such that one end will be oleophilic and the other end hydrophilic.

FIGS. 1, 2 and 3 illustrate an arrangement for maintaining foam at the stream flow region of a stream feeder to provide a liquid quenching environment for the cones of glass of the streams and the filaments attenuated therefrom. A foam suitable for the purpose comprises a dispersion of gas in a volatilizable liquid. The arrangement is inclusive of a stream feeder 10 which is electrically heated to maintain glass therein in a flowable condition. The floor of the feeder is fashioned with depending projections or tips 11, each having a passage through which flows a stream 13 of glass from the feeder.

The regions of the glass streams adjacent the projections are in the form of cones 13. The glass streams are attenuated to filaments 14 by winding a strand of the filaments on a rotating forming tube 15. Disposed at each side of the stream feeder is an enclosure 16 defining a chamber 17 into which foam is delivered. Each of the enclosures is fashioned with end walls 19, upper and lower walls 20 and 21 and a rear wall 22.

Each chamber 17 opens adjacent the stream flow region of the feeder as shown in FIG. 1. The enclosures 16 are preferably fashioned of metal such as copper so that they may be readily cooled and maintained at a safe operating temperature. Secured to the rear wall 22 of each enclosure 16 is a U-shaped tubular means or pipe 24 having parallel sections 25 joined by a semicircular loop 26. Cooling water or other fluid is circulated through the tubular means 24 to convey heat away from the walls of the enclosures 16.

A tube 28 connected with the rear wall 22 of each enclosure or unit 16, the tube 28 being connected with a supply of foam for delivery into each chamber 17. The foam is delivered from a supply under comparatively low pressure and the rate of delivery of the foam is controlled by a conventional valve means 30 associated with each of the tubes 28. Baffle means is preferably disposed in each of the enclosures 16 for distributing the foam throughout the chamber 17. The baffle means in each chamber 17 comprises a member 31 disposed in the position shown by spacers 34 and supported by bolts 32 threaded into openings in each rear wall 22.

The foam, delivered through the tube 28 in each unit is dispersed and distributed by the baffle 31 so that the chamber 17 is maintained substantially filled with foam.

The continuous feeding of foam into the chambers 17 moves the foam in the chambers into the stream flow region beneath the stream feeder 10 whereby the foam encompasses the cones 13 of glass of the streams and the filaments 14 attenuated from the streams.

The liquid of the foam, subjected to the heat from the glass streams and from the adjacent region of the stream feeder, is volatilized and may set up turbulence whereby the cones of glass and the filaments formed therefrom may be quenched during attenuation of the streams to filaments. The foam is of low density and the attenuated filaments move through the foam without materially affecting the quantity of foam maintained at the region below and adjacent the stream feeder.

In order to prevent premature heating of the foam in the chambers 17, additional cooling means may be employed, as it is undesirable to encounter volatilization of the liquid component of the foam prior to its delivery adjacent the glass streams. As shown in FIG. 1, a plurality of flat tubes or tubular members 36 are disposed in spaced relation at the outlet region of each chamber 17. The tubes 36 are connected with a water supply manifold 38 connected with a supply of cooling liquid such as water circulated through the tubes 36 to thereby avoid premature heating of the foam.

Any suitable foam having a volatilizable liquid component may be employed. For example, a foam suitable for the purpose comprises a composition containing 5% to 7% pearl starch; .2% cationic lubricant, such as octadecyl amine acetate; 1% to 3% mineral oil or vegetable oil; up to 1% carboxyl methyl cellulose and about .2% of Tween 81 (polyoxyethylene sorbitan monooleate); the remainder of the composition being a liquid, such as water.

The composition is prepared by cooking the pearl corn starch at 210° F. in water. In a separate container, the Tween 81 (polyoxyethylene sorbitan monooleate) is mixed with hydrogenated vegetable oil, carboxyl methyl cellulose and cationic lubricant and water slowly added with mixing until an emulsion is produced. Additional water is added slowly after the emulsion inverts to form a stable oil-in-water emulsion. This emulsion is blended with the corn starch solution prepared as above described and additional water added to provide the percent of solids indicated above.

Cornstarch, potato starch, tapioca starch, and other types can be used in lieu of the pearl starch in the above example. Any suitable mineral or vegetable oil may be used including whale oil. Any suitable foaming agent can be substituted for the Tween 81 (polyoxyethylene sorbitan monooleate) such as Triton X-100 (isooctyl phenyl polyethoxy ethanol), sulphated mineral oils and other well known emulsifying and foaming agents.

The liquid component of the foam may be used to help quench the cones of glass and filaments attenuated therefrom. When used as a quenching medium, the liquid component can be volatilized as the filaments are drawn through the foam.

The liquid component may also be used as a coating material for the filaments. As disclosed in my copending application Serial Number 1501 filed Jan. 8, 1970, a foam material suitable for coating the filaments may be of organic base, so that the surface has oleophobic portions extending outward and oleophilic portions extending into the organic material. In such instances the oleophobic portions preferably have a benzene ring adjacent the terminal end. As the fibers pass through the foam the bubbles are broken and the liquid component coats the fibers. The fibers may be made to contact the foamed coating material during or immediately after solidification to prevent the possibly contaminated atmosphere from reaching the surfaces of the glass fibers after solidification.

Whether the liquid component is volatilized or used as a coating, the foam may contain various gas components for treatment of the cones, filaments or feeder substrate. When the bubbles of the foam are broken, the gas contained therein is released.

The evolved or released gas may be of a type which will affect improvement in the fiber-forming operation in a manner similar to my invention set forth in my copending application Ser. No. 126,637 filed Mar. 12, 1971. As described in that application gas or gases may be fed to the stream delivery region of a stream feeder or orificed substrate to establish an environment providing an interfacial condition at the surface of the feeder or substrate fostering separation of the glass from the surface which is effective to minimize or substantially eliminate wetting of the surface by the glass and thereby greatly reduce or eliminate the tendency of the glass to flood at the surface and promote separation and isolation of beads of glass forming at the orifices during start-up of attenuation of the streams to discrete fibers.

Tests have shown that a material which either is adsorbable onto the feeder or substrate surface or a material which decomposes to form a thin carbon layer on the feeder can provide an interfacial condition or cushion resisting wetting of the surface by the glass. One example of a successful method of glass fiber formation involves the establishment of a nonatmospheric environment by feeding or delivering carbon dioxide to the stream flow region and feeding or delivering a small percentage of a hydrocarbon or organic gas such as propane ($C_3H_3$) to the environment. The propane may be premixed with the carbon dioxide or introduced separately into the environment.

The propane in the nonatmospheric or substantially nonoxidizing environment appears to be decomposed by the heat from the stream feeder and the molten glass, the pyrolysis resulting in decomposition products including hydrogen and carbon. Further, it appears that the hydrogen is adsorbed onto the feeder or substrate surface to an extent fostering a separation of the glass at the glass-metal interface. The hydrogen gas appears to provide a "gas cushion" effect at the interface resisting wetting of the surface by the glass and substantially eliminating or greatly reducing the tendency for the glass to flood the substrate surface embraced in the environment containing adsorbably hydrogen. The pyrolytic decomposition of the hydrocarbon also appears to provide carbon in a form of a thin layer of film adsorbed on the surface of the feeder or substrate which is substantially nonwettable by the heat-softened glass providing a major factor in the environment reducing the tendency of flooding of the glass.

A number of other gases have also been found satisfactory in providing an environment at a stream feeder or substrate surface of a character effective to establish an interfacial condition promoting the separation of the glass from the surface and thereby eliminating or reducing tendency for flooding of the feeder or substrate surface. Among the organic gases found suitable for the purpose other than propane are methane, ethane, butane, isobutane, ethylene, propylene, acetylene, cyclopropane, carbon tetrachloride and freon. Such gases as methane, propane and butane are preferred as they are readily available and render the method or process more economical. The organic or hydrocarbon gases are usable in an isolating environment of carbon dioxide.

The stabilizing or isolating environment provided by the carbon dioxide performs at least two functions. It acts to exclude air and other oxidizing materials to prevent the decomposable gas from burning. In addition, the isolating environment also serves to dilute the decomposable gas to a more satisfactory concentration. If not diluted, the excessive amounts of decomposable gas may result in a frothing on the feeder apparently caused by hydrogen or it may result in an excessive buildup of carbon on the feeder. The isolating environment helps control these factors.

Typically, carbon dioxide is used as the stabilizing or isolating environment. However, other gases have been found which perform satisfactorily. Such gases include nitrogen, helium, argon, neon and xenon where used with a heat-decomposable hydrocarbon in the fiber forming environment.

Another embodiment of the invention is to provide a carbonaceous material in the liquid phase. Since the foam is adjacent the hot fiber forming cones of molten glass, the liquid phase is volatilized to provide additional decomposable carbonaceous material which is effective to establish the dewetting environment adjacent the orificed feeder.

In another embodiment of the invention as illustrated in FIG. 3, the gas or gases may be applied to the feeder by other means and the foam may be used primarily as an envelope to help retain the gases near the orificed feeder. Mechanical means 40 are provided for supplying the dewetting gases between the upper surface of the foam 42 and the feeder 10. Auxiliary barrier means 43 and 44 are provided at either side of the feeder 10 to reduce the loss of the gases upwardly and to the sides. The foam surface 42 acts as a barrier to the gases and helps prevent their downward escape.

In instances where the gas or gases are supplied through such mechanical means or tube 40, the foam may or may not contain a functional dewetting gas. For example, the foam may contain a heat-decomposable or dewetting gas such as propane to supplement that which is supplied by the tube 40. Or the foam may be used to supply the isolating environment of carbon dioxide or the like. In another embodiment, all the necessary dewetting gases may be supplied by the tube 40 and the foam may contain other special gases used to coat or treat the newly formed filaments.

For some applications a continuous supply of foam may be unnecessary. For example, it may be advantageous to use the foam as an aid in starting fiber production. Flooding or wetting of the glass on the feeder is especially critical when fiber production is first started from a feeder. A temporary application of a carbon-containing foam should reduce the time required for beads of glass to form and drop during the starting procedure. In such instances, the operator could use a hand-held aerosol can to distribute the foam adjacent the orificed surface of the feeder.

It is apparent that, within the scope of the invention, modifications and different arrangements may be made other than as herein disclosed, and the present disclosure is illustrative merely, the invention comprehending all variations thereof.

I claim:
1. A method of forming glass fibers comprising:
feeding streams of heat-softened glass from a wall of a stream feeder;
forming the glass streams into fibers;
supplying to a region adjacent the wall a foam comprising a liquid phase and a gaseous phase; and
supplying a gas from the foam effective to establish an environment at the surface of the wall promoting separation of the molten glass from the surface to minimize wetting of such surface by the molten glass.
2. A method of forming glass fibers comprising:
feeding streams of heat softened glass from an orificed feeder;
supplying to a region adjacent the orifices of the feeder a foam comprising a liquid phase and a gaseous phase; and
disrupting cells of the foam for supply of gas to establish a gaseous environment at the feeder effective to promote separation of the molten glass from the feeder.
3. The method of forming fibers, as recited in Claim 2, wherein the disruption of the foam is accomplished by volatilizing the liquid phase.
4. The method of forming fibers, as recited in Claim 2, wherein the foam contains a gaseous phase comprising a decomposable carbonaceous material which is released into the region upon disruption of the cells of the foam.
5. The method of forming fibers, as recited in Claim 2, wherein the gas is supplied from the liquid phase which comprises a heat decomposable carbonaceous material which is volatilized for inclusion in the controlled gaseous environment.

6. The method of forming fibers, as recited in Claim 2, wherein the dissipated foam is continuously replenished.

7. A method of forming glass fibers comprising:
feeding streams of heat-softened glass from an orificed feeder;
supplying adjacent the orifices of the feeder a foam comprising a liquid phase and a gaseous phase, the foam also comprising a heat decomposable carbonaceous material; and
establishing a gaseous environment in an amount effective to promote separation of the molten glass from the feeder by drawing the fibers through the foam to thereby dissipate the foam and provide a carbonaceous gas in the region adjacent the feeder.

8. The method of forming glass fibers comprising:
flowing molten streams of glass from a stream feeder;
attenuating the molten streams of glass into fibers;
supplying a foam of liquid comprising a liquid phase and a gaseous phase; and
drawing the fibers through the foam to cause dissipation of the foam and release of a gas in the region of the streams of glass in amount effective to promote separation of the molten glass from the feeder.

9. The method of Claim 8 in which the fibers are drawn through the foam to quench the streams of glass and to cause dissipation of the foam.

10. The method of Claim 8 in which the foam is supplied sufficiently close to the stream feeder to inhibit escape of the gas from the region of the streams of glass.

11. A method of controlling molten glass at a surface of a substrate at which the molten glass is present, comprising:
establishing a body of foam adjacent the surface, the foam comprising a liquid phase and a gaseous phase, the foam also comprising a decomposable carbonaceous material;
volatilizing the liquid phase of the foam to supply the gaseous phase of the foam to establish an isolating environment at the surface of the substrate which is effective to promote separation of the molten glass from the surface.

12. The method of forming glass fibers comprising:
feeding streams of molten glass from a feeder;
attenuating molten streams of glass into fibers;
producing a foam comprising a liquid glass fiber coating material and a heat-decomposable carbonaceous gas;
supporting the foam by means which permit the fibers to be drawn through the foam to thereby cause bubbles of the foam to break and provide a substantially foam free liquid coating on the fibers emerging from the foam and to provide an environment adjacent the feeder which is effective to promote separation of the molten glass from the feeder surface.

13. A method of forming mineral fibers comprising:
feeding streams of heat-softened mineral fiber forming material from a wall of a stream feeder;
forming the streams into fibers;
supplying to a region adjacent the wall a foam comprising a liquid phase and a gaseous phase; and
supplying a gas from the foam effective to establish an environment at the surface of the wall promoting separation of the heat-softened mineral fiber forming mineral material from the surface to minimize wetting of such surface by such material.

References Cited

UNITED STATES PATENTS

| | | | |
|---|---|---|---|
| 2,252,689 | 8/1949 | Bradshaw | 65—11 W |
| 3,025,202 | 3/1962 | Morgan et al. | 117—126 GB |
| 3,211,684 | 10/1965 | Eakins | 117—126 GS |
| 3,345,147 | 10/1967 | Russell | 65—3 |
| 3,676,094 | 7/1972 | Russell | 65—3 |

ROBERT L. LINDSAY, JR., Primary Examiner

U.S. Cl. X.R.

65—3, 12; 117—126 GB, 126 GS